(No Model.) 2 Sheets—Sheet 1.
A. DE FIGANIÈRE
TREATMENT OF ORES.
No. 259,104. Patented June 6, 1882.
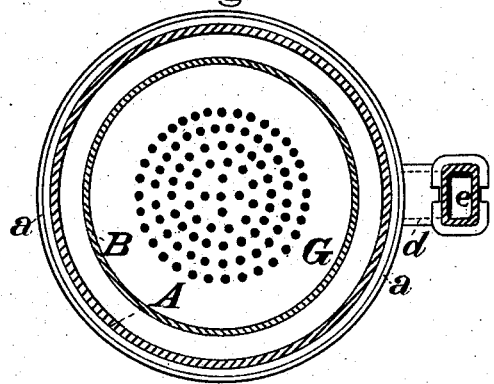
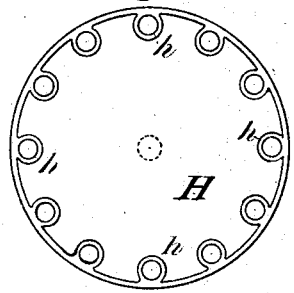
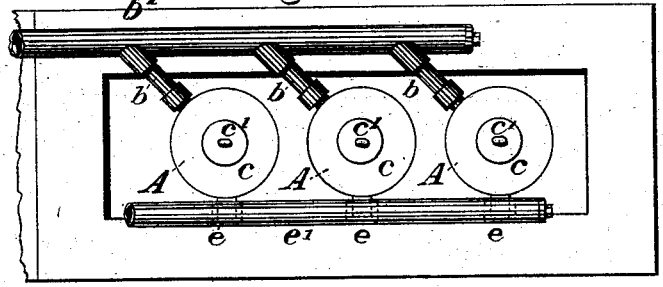
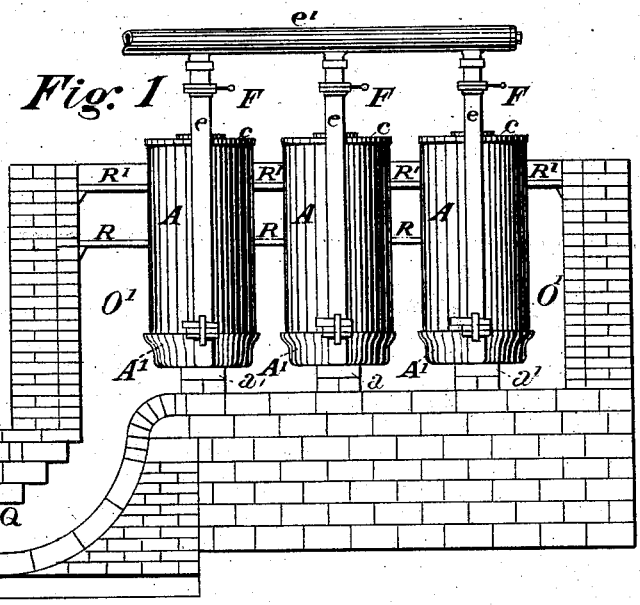

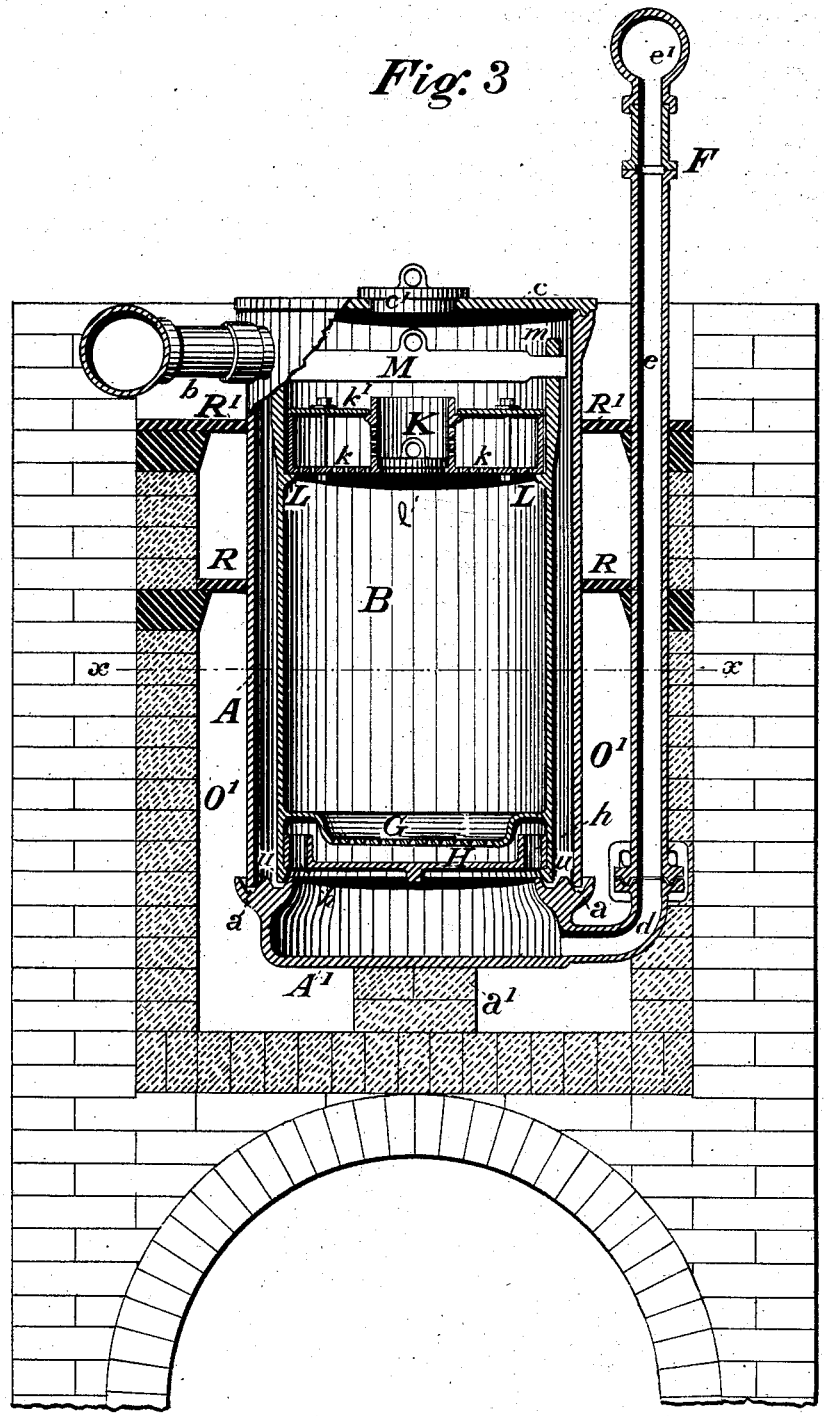

UNITED STATES PATENT OFFICE.

AFFONSO DE FIGANIÈRE, OF PHILADELPHIA, PENNSYLVANIA.

TREATMENT OF ORES.

SPECIFICATION forming part of Letters Patent No. 259,104, dated June 6, 1882.

Application filed January 10, 1881. (No model.)

*To all whom it may concern:*

Be it known that I, AFFONSO DE FIGANIÈRE, of the city and county of Philadelphia, in the State of Pennsylvania, have invented certain new and useful Improvements in the Treatment of Ores, of which improvements the following is a specification.

The object of my invention is to provide improved means for thorough, rapid, and economical desulphurization of auriferous, argentiferous, and cupriferous sulphides as preliminary to the extraction therefrom of their precious metals; and to this end my improvements consist in a process of and apparatus for the treatment of ores of such character as hereinafter fully set forth.

In the practice of my invention the ore to be treated, having been previously ground to a degree of fineness that will admit of its passage through a screen having a mesh of about eighteen apertures to the square inch, is placed to a depth that will admit of a free passage of heated air in a suitable covered metallic vessel located within and heated by a furnace or flue, and the air is supplied to and drawn through the charge of ground and heated ore. In the passage of the air through the charge oxygen is supplied thereto in requisite quantity to oxidize the sulphur, iron, and the other oxidizable metals therein, and the sulphur, as sulphurous-acid gas, is carried off from the vessel through an escape-pipe provided for the purpose, being aided by the suction of the fan or other suitable exhauster which is used for inducing the passage of the air through the charge. Upon the completion of the operation the oxidized and desulphurized ore is removed from the vessel, and will then be in condition for the subsequent operations necessary for the extraction of its precious metals and copper, which operations, being familiar to those skilled in the art, and, moreover, constituting no part of my present invention, need not be herein set forth.

It is essential, in the operation of my invention, that only such an amount of oxygen shall be supplied to the charge of ore as will suffice for the oxidation of the baser metals therein and the evolution of the combined sulphur therefrom, to the end that intense combustion or the presence of flame in the containing vessel shall not be permitted, and therefore facilities for the regulated admission of air must be provided. The result of the admission of an excess of oxygen would be to generate undue heat, thereby reducing the iron contained in the ore and resulting in the loss of the charge by "matting" and the probable destruction of the containing vessel. It is further desirable that an equable temperature shall be maintained in the containing vessel, and this may be most readily as well as economically attained by the employment as a heating medium of a gas-furnace, or of one in which a regulated blast of air (preferably heated) is directed upon the combustible, various descriptions of which are at present employed for sundry purposes in the arts.

In the accompanying drawings, Figure 1 is a longitudinal sectional elevation of an apparatus for the practice of my hereinbefore described process; Fig. 2, a plan or top view of the same; Fig. 3, a vertical central section on an enlarged scale through the retort and ore-vessel; Fig. 4, a horizontal section through the same at the line $x\, x$ of Fig. 3, and Fig. 5 a plan view of the bottom of the ore-vessel.

A series of vertical cylindrical retorts, A, (one or more, according to the quantity of ore desired to be treated daily,) is arranged within a combustion chamber or flue, O′, receiving the heated products of a furnace, O, which may be of any desired construction proper to develop a high and equable temperature, in this instance being shown as provided with a grate, P, through which a downward draft is maintained by a blast of air supplied through a pipe, T, having a regulating valve or gate, U, the products of combustion passing under the bridge Q to the flue O′. Each of the retorts A is cast open at both ends, and when the retort is in position its lower end is closed by fitting into an asbestus-packed groove, $a$, in the top of a cylindrical supply-chamber, A′, supported upon a fire-brick pier, $a'$, in the flue O′. The upper end of the retort is closed by a packed or luted lid or cap, $c$, having a central opening covered by a bonnet, $c'$. The lower supply-chamber of each retort is provided with a short pipe, $d$, connected by a vertical pipe, $e$, having a blast gate or valve, F, with an air-pipe, $e'$, of sufficient capacity for the supply of the entire series of retorts. Air is admitted to the pipe $e'$, and is heated in its passage through the pipes $e$, which pass through the flue $O'$ adjacent to the several retorts. A fume pipe, $b$, is connected to each of the retorts A near its top, and leads into an escape-pipe, $b'$, common to the series of retorts, said escape-pipe being led to a proper suction pan or exhauster for the purpose of inducing the current of air through the charge and facilitating the evolution of the gaseous products.

The charge of ore to be treated is placed in a cylindrical vessel, B, the diameter and height of which are such as to enable it to be conveniently inserted in and removed from the retort A. The lower end of the vessel B rests in a circular groove, $u$, in the top of the supply-chamber $A'$ of the retort, the joint being packed with asbestus or analogous material to prevent the escape of air into the space around the vessel, and its bottom H, which is removable, is solid or unperforated, except adjacent to its periphery, around which are located a series of upwardly-projecting pipes or passages, $h$. A partition or diaphragm, G, extends across the vessel B, above the bottom H, the central portion of said partition being dished, so as to stand at a lower level than that of the tops of the air-pipes $h$, and being grated or perforated with openings which allow the passage of the fragments of ore. The portion which is above the air-pipes $h$ is solid or unperforated, and the object of the partition is to direct the incoming currents of air toward the central portion of the vessel and to prevent the entrance of portions of the charge into the air-pipes and bottom chamber of the retort.

Lugs $m$, formed upon the top of the vessel B, serve for the reception of a cross-bar or bail, M, by which it may be conveniently handled, and its top is closed by a chambered cover, L, adapted to contain a loose asbestus filling, and having a central tube, K, in the lower end of which a bonnet or stopper, $l$, is fitted. Openings $k$ are formed in the bottom plate of the cover L, through which the fumes from the charge escape, and after passing through the filling, the object of which is to prevent the loss of any portions of the dust of the ore which may be carried up with them, pass through openings $k'$ in the tube K into the upper portion of the retort A, and thence through the fume-pipe $b$ into the escape-pipe $b'$. The supply of air to the retort and ore-vessel is regulated by the operator as required by means of the blast-gate F, the bonnets $c'$ and $l$ affording facilities for observation when the first charge of any particular ore is made, the appearance of a blue flame of burning sulphur indicating that an excess of oxygen is being supplied to the charge.

I am aware that the desulphurization of ores by the action thereon of heated air is not new, and do not therefore broadly claim the same.

I am further aware that air has heretofore been introduced into a closed vessel at the bottom of the same with sufficient force to keep the air in a state of agitation or ebullition, and that air heated to a temperature of 500° to 600° has been forced through a charge of finely-ground ore; but both of these methods are essentially different from mine, in the fact that in mine a rapid combustion of the sulphur present in the charge, thereby generating a high temperature, is prevented by means of admitting alone that proportion of oxygen that will eliminate the sulphur—as $SO_2$, sulphurous acid, an uninflammable gas—and oxidize those metals that are oxidizable, which results have not heretofore been attained. The consequence of an excess of air is a rapid combustion of the sulphur and oxidation of the metals on the surface of the particles of the charge, producing invariably sufficient heat to fuse the particles of the ore superficially, and thereby preventing further action of oxygen on the interior mass, and precluding, consequently, thorough desulphurization.

I claim as my invention and desire to secure by Letters Patent—

1. In the art of desulphurizing ores by passing heated air through the same, the process of freeing the ore from sulphur without matting the charge, which consists in reducing the ore to a granulated state, as described, then heating such ore and passing through the same a regulated current of hot air, such current being induced by constantly exhausting the atmosphere of the vessel containing the ore, substantially as and for the purposes set forth.

2. In an apparatus for the desulphurization of ores, the combination, substantially as set forth, of a furnace, a retort heated thereby, an air-supply pipe provided with a regulating valve or gate and communicating with said retort at one end, an escape-pipe communicating with said retort at the other end, and an ore-vessel located within said retort, said vessel having a perforated bottom and cover and being interposed between the supply and escape pipes of the retort, so as to form the sole avenue of communication between the said pipes.

3. In an apparatus for the desulphurization of ores, the combination, substantially as set forth, of the retort-bottom provided with grooves in its upper edge, as described, and having a pipe or nozzle for connection to an air-supply pipe, a retort-body, and an internal ore-vessel, each fitted by a packed joint to a groove in the upper edge of the retort-bottom above its pipe or nozzle, whereby an air-supply chamber is formed in the base of the retort, as set forth.

4. In an apparatus for the desulphurization of ores, the combination, substantially as set forth, of a retort having an air-chamber, as described, an ore-vessel having a perforated bottom and being provided with a perforated cover, the said ore-vessel being placed within the retort and communicating therewith through perforations in a cap or cover, and with the supply-chamber through the perforations in the bottom, as set forth.

5. In an apparatus for the desulphurization of ores, a vessel having a shell or body, a bottom plate with a series of short open pipes or passages adjacent to its periphery, and a partition or diaphragm extending across the body adjacent to the bottom plate, said partition being imperforate around and above the pipes of said plate, and being dished or recessed to a point below the upper ends of said pipes and perforated throughout its dished portion, substantially as set forth.

6. In an apparatus for the desulphurization of ores, a vessel having a shell or body, a bottom plate provided with an air-supply, and a chambered lid or cover constructed, as described, to receive a suitable packing, provided with a central tube, and having a series of perforations arranged in its lower plate and central tube, so as to direct the discharge of fumes from the vessel through the packing of the cover and through the central tube, substantially as set forth.

A. DE FIGANIÈRE.

Witnesses:
J. SNOWDEN BELL,
D. L. COLLIER.